W. D. TELLER.
CUSHION TIRE.
APPLICATION FILED APR. 29, 1922.
1,428,719.  Patented Sept. 12, 1922.
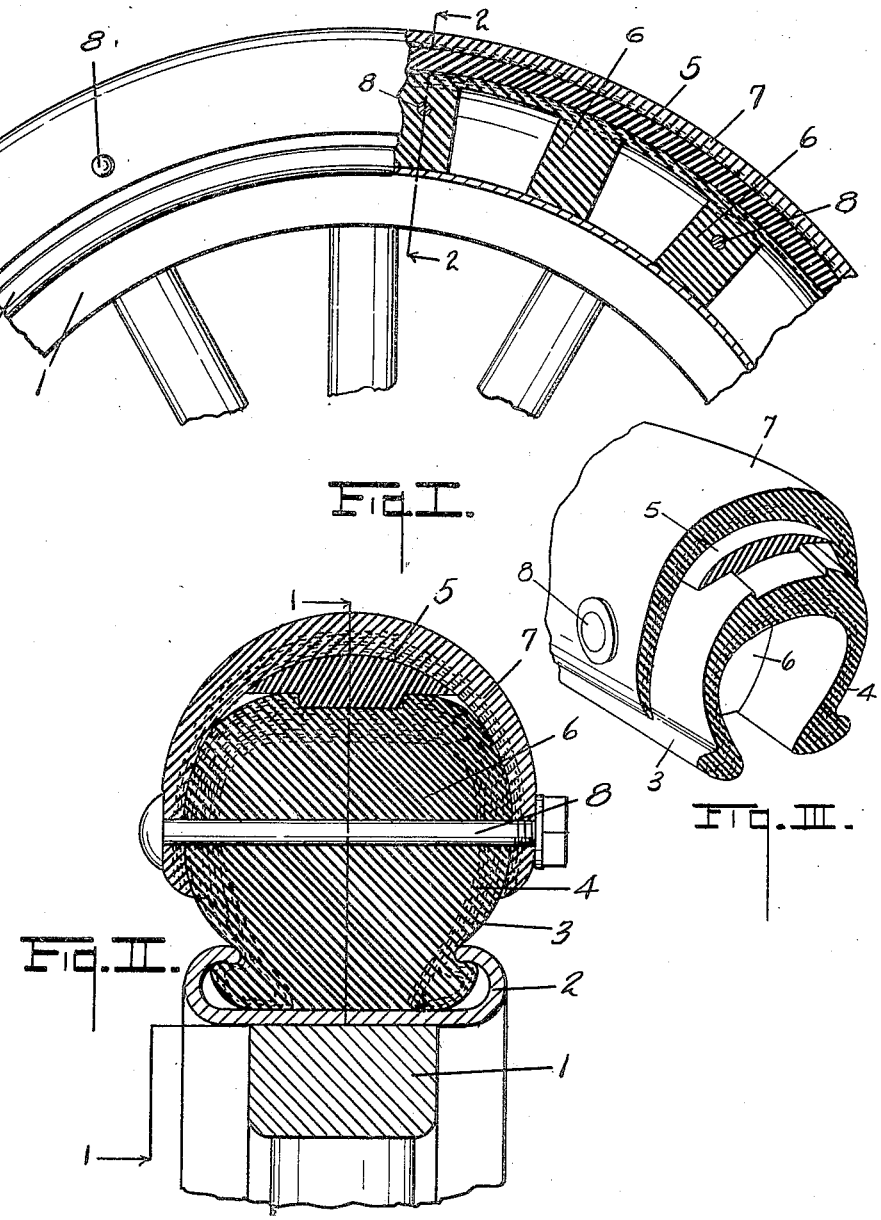
INVENTOR.
Washington D. Teller
BY
Chappell & Earl
ATTORNEYS.

Patented Sept. 12, 1922.

1,428,719

UNITED STATES PATENT OFFICE.

WASHINGTON D. TELLER, OF WASEPI, MICHIGAN.

CUSHION TIRE.

Application filed April 29, 1922. Serial No. 557,282.

*To all whom it may concern:*

Be it known that I, WASHINGTON D. TELLER, a citizen of the United States, residing at Wasepi, in the county of St. Joseph, State of Michigan, have invented certain new and useful Improvements in Cushion Tires, of which the following is a specification.

This invention relates to improvements in cushion tires.

The objects of the invention are:

First, to provide an improved cushion tire which is quite resilient and yielding and at the same time is very durable.

Second, to provide an improved cushion tire having these advantages in which the tread portion or outer casing may be removed and renewed when worn out, such outer casing being economical in structure.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is clearly illustrated in the accompanying drawing, forming part of this specification, in which:

Fig. I is a fragmentary view of a wheel equipped with one of my improved tires, the tire being shown partially in central longitudinal section on a line corresponding to line 1—1 of Fig. II.

Fig. II is an enlarged transverse section on a line corresponding to line 2—2 of Fig. I.

Fig. III is a detail perspective view of a cut away section of my tire showing the relation of the parts.

In the drawings sectional views are taken looking in the direction of the little arrows at the ends of the section lines and similar numerals of reference refer to similar parts throughout the several views.

Referring to the drawing the wheel designated generally by the numeral 1 is provided with a rim 2 of the clincher type. The cushion body member 3 is in the form of a shoe having circumferentially spaced transverse portions 6 connected to the side walls 4 thereof and is provided with the usual rim engaging beads at the edges thereof. The body 3 is provided with a peripheral recess in which is seated a tread cushion 5 of soft resilient rubber. The outer casing member 7 embraces this tread cushion and the sides of the body only. The casing 7 is secured by bolts 8 arranged through the body in substantially spaced relation and while they effectively secure the casing in position, at the same time the casing is loosely retained permitting the escape of sand at its edges, so that in the event of holes being formed in the casing which would permit the entrance of sand it works out freely, thereby preventing injury to the body member. The body member has a fabric wall of the type usually provided for cushion tires and outer casings, so that the bolts for securing the outer casing are effectively retained.

With the parts thus arranged I secure a tire which is very resilient, being quite similar to a pneumatic tire in its action and at the same time the tire is very durable and is comparatively economical to produce. The outer casing may be removed as occasion may require, the inner tire member being so protected that under ordinary conditions it may be used for a long period of time.

Having thus described my invention what I claim as new and desire to secure by Letters Patent is:

1. In a tire, the combination with a cushion body member provided with rim engaging means comprising a fabric wall having resilient cushion means therein, a tread portion of relatively soft rubber seated on the periphery of said body member, an outer casing member embracing said body member and resilient tread portion with its sides lapping the sides of said body member and secured thereto at substantially spaced intervals by cross bolts disposed through said outer casing and body member, substantially as described.

2. In a tire, the combination with a cushion body member provided with rim engaging means, of a resilient tread portion of relatively soft rubber seated on the periphery of said body member, an outer casing member embracing said body member and resilient tread portion with its sides lapping the sides of said body member and secured thereto at substantially spaced intervals by cross bolts disposed through said outer casing and body member, substantially as described.

3. In a tire, the combination with a cushion body member provided with rim engaging means, of a tread portion of relatively soft rubber seated on the periphery of said body member, and an outer casing member embracing said body member and resilient tread portion with its sides lapping the sides of said body member and secured thereto at substantially spaced intervals, substantially as described.

4. In a tire, the combination with a cushion body member provided with rim engaging means comprising a fabric wall having resilient cushion means therein, an outer casing member embracing said body member with its sides lapping the sides thereof and secured thereto at substantially spaced intervals by cross bolts disposed through said outer casing and body member.

In witness whereof, I have hereunto set my hand and seal.

WASHINGTON D. TELLER. [L. S.]